United States Patent
Yoshida

(10) Patent No.: US 6,201,228 B1
(45) Date of Patent: Mar. 13, 2001

(54) OPTICAL PICKUP INTEGRATED WITH OPTICAL SYSTEM

(75) Inventor: Yoshio Yoshida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/028,334

(22) Filed: Feb. 24, 1998

(30) Foreign Application Priority Data

Feb. 25, 1997 (JP) .................................... 9-040517

(51) Int. Cl.[7] ...................................... G02B 7/04
(52) U.S. Cl. ................... 250/201.5; 250/216; 250/225; 369/44.14
(58) Field of Search ................ 250/201.5, 216, 250/225; 369/44.14, 44.42, 44.23

(56) References Cited

U.S. PATENT DOCUMENTS 5,453,607 * 9/1995 Ando et al. ........................ 250/201.5

FOREIGN PATENT DOCUMENTS

| 2300065 | 10/1996 | (GB) . |
| 5-135420 | 6/1993 | (JP) . |
| 7-130023 | 11/1993 | (JP) . |
| 6-290504 | 10/1994 | (JP) . |
| 6-295480 | 10/1994 | (JP) . |
| 8-171 747 | 2/1996 | (JP) . |

* cited by examiner

*Primary Examiner*—Que T. Le
(74) *Attorney, Agent, or Firm*—Dike, Bronstein, Roberts & Cushman, LLP; David G. Conlin

(57) ABSTRACT

In an optical pickup, a beam splitter is arranged on an optical path between a hologram and a grating. Beam splitter includes a first reflecting surface reflecting part of a beam reflected from a disk, and a second reflecting surface arranged parallel to the first reflecting surface. Part of the beam which is reflected from the disk and passed through hologram is reflected at the first reflecting surface and thereafter reflected by the second reflecting surface of beam splitter, and thereafter directed to optical waveguide device, whereby a signal recorded on the disk is detected (reproduced). The beam which has transmitted through hologram and the first reflecting surface is directed to photodiode and detected as a servo error signal.

9 Claims, 9 Drawing Sheets

OPTICAL PICKUP INTEGRATED WITH OPTICAL SYSTEM

BACKGROUND OF THE INVENTION

1. Field of the Invention

The present invention relates to an improvement in an optical pickup used in an optical recording and reproducing apparatus for recording and reproducing of an optical recording medium such as a magneto-optical disk. More specifically, the present invention relates to an improvement in an optical pickup integrated with optical system.

2. Description of the Background Art

When a signal recorded on a magneto-optical disk is reproduced by using an optical pickup, a beam of linearly polarized light is directed to the magneto-optical disk by the optical pickup. The plane of polarization of the beam reflected from the magneto-optical disk is rotated to right or left slightly dependent on magnetic direction on the magneto-optical disk by Kerr effect. With this reflected beam being passed through an analyzer, the direction of rotation of plane of polarization of the beam is detected as a variation in the amount of light, and recorded signal is reproduced.

FIG. 9 is a plan view of an optical pickup employing an optical waveguide device for a magneto-optical disk disclosed in Japanese Patent Laying-Open No. 8-171747. FIGS. 10 and 11 are a side view and a plan view respectively, of the optical waveguide device shown in FIG. 9.

When a signal recorded on the magneto-optical disk is to be detected (reproduced), the optical pickup generally directs a beam emitted from a laser diode to the magneto-optical disk. The beam is reflected and splitted into a beam for detecting a servo error signal and a beam for detecting the recorded signal, and the splitted beams are used by the optical pickup for detecting signals. At this time, a beam splitter is used for splitting the beam.

In the optical pickup PC1 shown in FIG. 9, a beam 102 emitted from laser diode 101 provided in a package 118 is divided into a main beam and a tracking beam by a grating 103 in package 118, passed through a hologram 104 in package 118, and incident on a beam splitter 105 formed by adhering a plate glass 113 and a prism 114. The beam entering beam splitter 105 is reflected by a mirror at an interface a between plane glass 113 and prism 114, passes through a collimator lens 106, reflected vertically upward by a mirror 107, and collected onto the magneto-optical disk (not shown) by an objective lens 108.

Thereafter, the beam reflected from the magneto-optical disk passes through objective lens 108, mirror 107 and collimator lens 106 and enters beam splitter 105, where the beam is splitted into a beam 109 for detecting a servo error signal, and a beam 110 for detecting the recorded signal. Beam 109 enters from beam splitter 105 to hologram 104, where the beam is diffracted, and thereafter the beam enters a photodiode 111 and detected by photodiode 111 as a servo error signal. Beam 110 is reflected by a mirror surface on a rear surface b of plane glass 113 which constitutes beam splitter 105, and therefore, it does not pass through hologram 104 but enters a coupler portion of optical waveguide device 112. Beam 110 which is coupled to the optical waveguide at this coupler portion is divided into TE beam and TM beam, and enter a photodetector, where the beams are detected (reproduced) as the information signal.

Referring to FIGS. 10 and 11, the coupler portion of optical waveguide device 112 will be described. The coupler portion includes a prism 121 and a microlens 122. Beam 110 reflected at the surface b of beam splitter 105 passes the right side of hologram 104, enters package 118 and is once converged and thereafter diverged. Then, the beam passes through microlens 122 and enters prism 121. At this time, the diverged beam 110 is converted to a collimated beam by microlens 122 provided on prism 121, and the collimated beam is coupled to optical waveguide 123 at a prescribed incident angle. The beam coupled to optical waveguide 123 is divided into TE and TM beams by a polarized beam splitter 129, and detected (reproduced) as the information signal, by photodiode 124.

In optical pickup PC1 of FIG. 9, laser diode 101 and optical waveguide device 112 are attached to package 118 and, thereafter, beam splitter 105 is attached to package 118. Therefore, offset in the position of attachment of optical waveguide 112, or relative positional offset between the beam reflected from the magneto-optical disk and optical waveguide device 112 caused by error in manufacturing plate glass 113 of beam splitter 105 must be compensated for by position adjustment of beam splitter 105.

FIG. 12 shows a principle of compensation of the relative positional offset between the beam reflected from the magneto-optical disk and optical waveguide device 112 by adjusting attitude of beam splitter 105 shown in FIG. 9. Referring to FIG. 12, assume that optical waveguide device 112 is arranged offset in the direction of the arrow Y. At this time, the beam emitted from laser diode 101 proceeds along an optical path L101, is reflected by a surface a of prism 114, proceeds along an optical path L102 and is incident on the magneto-optical disk. Thereafter, the beam reflected from the magneto-optical disk proceeds along optical path L102, is reflected at surface b of plate glass 113 and proceeds along an optical path L103 to optical waveguide device 112. At this time, assume that relative position between optical path L103 and optical waveguide device 112 is offset. When beam splitter 105 is rotated by θ about the X axis, the beam reflected from the magneto-optical disk would proceed along optical paths L202→L203 denoted by the dotted lines, and correctly enter optical waveguide device 112.

In the optical pickup PC1 of FIG. 9, beam splitter 105 is arranged between collimator lens 106 and hologram 104, which means that it is at a considerable distance from the light source, and therefore it requires a large effective aperture (the scope through which the beam passes in beam splitter 105). As a result, beam 110 converges very close to a lower surface of a member 117 on which grating 103 is formed, and therefore the point of convergence cannot directly be coupled to optical waveguide 123. From this reason, microlens 122 for converting the divergent beam 110 to a collimated beam has been required. Focal distance of microlens 122 is about 1 mm. It is difficult to form a lens having such a short focal distance on prism 121 of the coupler.

Further, since the surface a is inclined when the attitude of beam splitter 105 is adjusted, optical path L101 of the beam emitted from laser diode 101 is offset from the original optical path L102 by 2θ, to optical path L202. As a result, the center of the beam emitted from laser diode 101 may possibly be offset from the center of collimator lens 106, or the collimated beam emitted from collimator lens 106 may proceed obliquely. It has been difficult to work out and apply a solution to such problems.

Further, in the optical pickup PC1 shown in FIG. 9, in order that one main beam spot and two tracking beam spots have matched orientation on a track of the magneto-optical disk, a separate mechanism for rotating package 118 containing laser diode 101 and beam splitter 105 about an optical axis (see chain-dotted line CL in the figure) of collimator lens 106 has been required.

The beam emitted from laser diode 101, passed through surface a and reflected at surface b is reflected from the magneto-optical disk and is detected (reproduced) as a signal by a photodetector. In order to prevent deterioration of quality of the detected signal, it has been necessary to form an antireflection film 116 partially at a portion of surface b which opposes to laser diode 101. This lowers efficiency in mass production of beam splitter 105.

Further, since optical waveguide device 112 is directly arranged in package 118, three-dimensional positional adjustment including adjustment of height at the time of arrangement has been difficult.

Further, an optical pickup has been proposed which employs an optical system including a cylindrical lens combined with a coupler prism on the optical waveguide, in order to converge the beam reflected from the disk and to couple the beam with the optical waveguide. In this optical system, the number of components is increased because of the provision of the cylindrical lens. Therefore, this optical pickup is disadvantageous in that it has considerably large scale.

SUMMARY OF THE INVENTION

An object of the present invention is to provide an optical pickup reduced in size.

Another object of the present invention is to provide an optical pickup which facilitates adjustment of the optical system.

Another object of the present invention is to provide an highly reliable optical pickup.

The above described objects of the present invention can be attained by the optical pickup including a light source, a light converging portion for collecting light beam emitted from the light source onto an optical recording medium, a beam dividing portion arranged on an optical path from the light source to the light converging portion for dividing the light beam from the light source, a diffracting portion arranged on the optical path between the light converging portion and the beam dividing portion for diffracting a part of the beam reflected from the optical recording medium, a beam splitter arranged between the beam dividing portion and the diffracting portion, a photodetector portion for electrically detecting the reflected beam which is diffracted by the diffracting portion, and a polarization detecting portion for detecting rotation of the plane of polarization of the beam reflected from the optical recording medium and passed through the beam splitter. The beam splitter has a first reflecting surface which transmits the light beam from the light source, transmits part of the beam reflected from the optical recording medium and has passed through the diffracting portion in a direction not interfering with the beam dividing portion and reflecting remaining part of the reflected beam which has passed through the diffracting portion, and a second reflecting surface reflecting the beam reflected by the first reflecting surface to the direction of the polarization detecting portion.

In the optical pickup structure as described above, since the first reflecting surface is arranged between the diffracting portion and the light source, degree of freedom in arranging the polarization detecting portion is increased, and it becomes easier to guide the beam reflected from the optical recording medium to the polarization detecting portion without a microlens.

Further, since the beam dividing portion for dividing the light beam from the light source is arranged between the light source and the diffracting portion, it is possible to detect a tracking signal at the time of signal reproduction, recorded on the optical recording medium, by the three-beam method which allows stable tracing. Further, the beam dividing portion can be arranged between the light source and the first reflecting surface such that the light beam from the light source, the reflected beam of the tracking beam and the reflecting beam of the main beam do not overlap with each other.

The beam splitter includes a member having parallelogram cross section and trapezoidal members on both sides thereof. The first and second reflecting surfaces are provided by opposing two surfaces of the member having parallelogram cross section. These two surfaces are protected by the trapezoidal members.

In this manner, a structure is realized in which the second reflecting surface is arranged parallel to the first reflecting surface so that the beam reflected from the optical recording medium is guided to the polarization detecting portion. This facilitates adjustment of the optical system.

Further, since the first and second reflecting surfaces are protected by the trapezoidal members, contamination of the reflecting surfaces during assembly or use of the beam splitter and resulting deterioration of optical characteristics can be avoided. Therefore, reproduction signals with superior SN ratio can be obtained.

The beam dividing portion or the diffracting portion may be stacked on the beam splitter.

Therefore, the optical pickup can be assembled by stacking the beam dividing portion and the diffracting portion on the beam splitter, which allows reduction in size of the optical pickup.

An optical waveguide device is used as the aforementioned polarization detecting portion. Accordingly, part of the optical system and the photodetector portion can be integrated, which allows reduction in size, weight and cost of the optical pickup.

The photodetector portion mentioned above is a photodiode, which photodiode is integrated with the optical waveguide device. Accordingly, part of the optical system and electronic circuitry can be integrated, allowing reduction in size, weight and cost of the optical pickup.

The light source, the photodetector portion and the polarization detecting portion mentioned above are arranged in one same package and air-tightly sealed. Since the package is air-tightly sealed, it is possible to prevent the problem that an adhesive used for fixing various members in the package absorbs moisture and swells, changing relative position of the reflected beam from the photodetector portion, lowering an output from the optical pickup.

The optical waveguide device is adhered and fixed in the package with a wedge shaped block formed of a light transmitting material interposed.

This facilitates adjustment of three-dimensional position of the optical waveguide device. Further, since the wedge shaped block is of a light transmitting material, it is possible to use a photo-curing adhesive, which ensures the time for adjusting position and prevents thermal damage to the optical waveguide device. When the wedge shaped block is formed of glass or resin, the optical waveguide device can be electrically insulated from the light source or the photodetector portion, and therefore degree of freedom in designing the electric circuitry connected to the optical pickup is increased. Further, the optical waveguide device is less susceptible to the influence of other circuitry. Therefore, reproduction signals with superior SN ratio can be obtained.

The beam splitter mentioned above is stacked on the beam dividing portion with a columner member interposed. By utilizing rolling of the columner member between the beam dividing portion and the beam splitter, inclination of the beam splitter can easily be adjusted.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in the following with reference to the figures.

Figure 1:
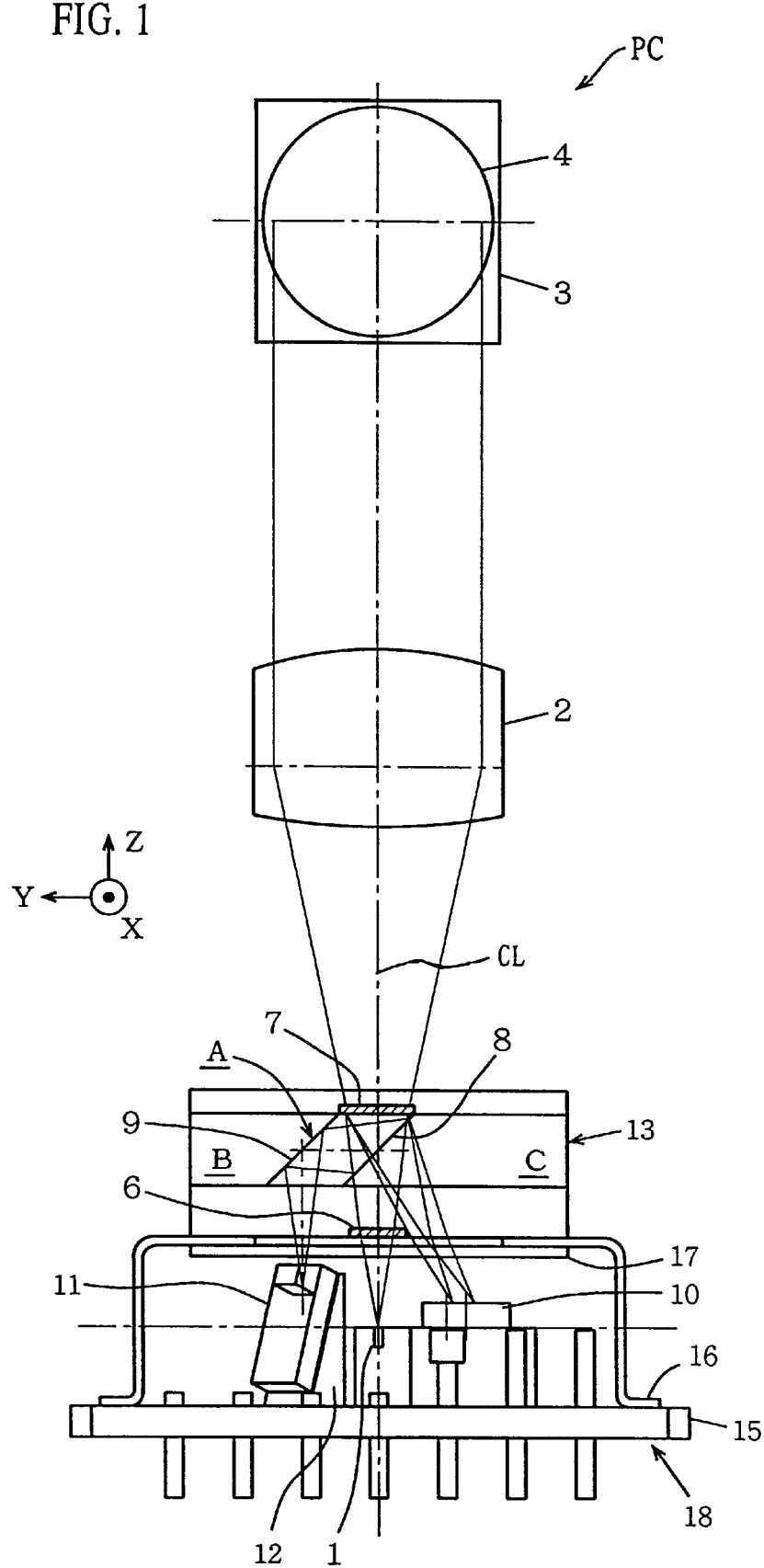
FIG. 1 is a plan view of an optical pickup in accordance with one embodiment of the present invention.
Figure 2:
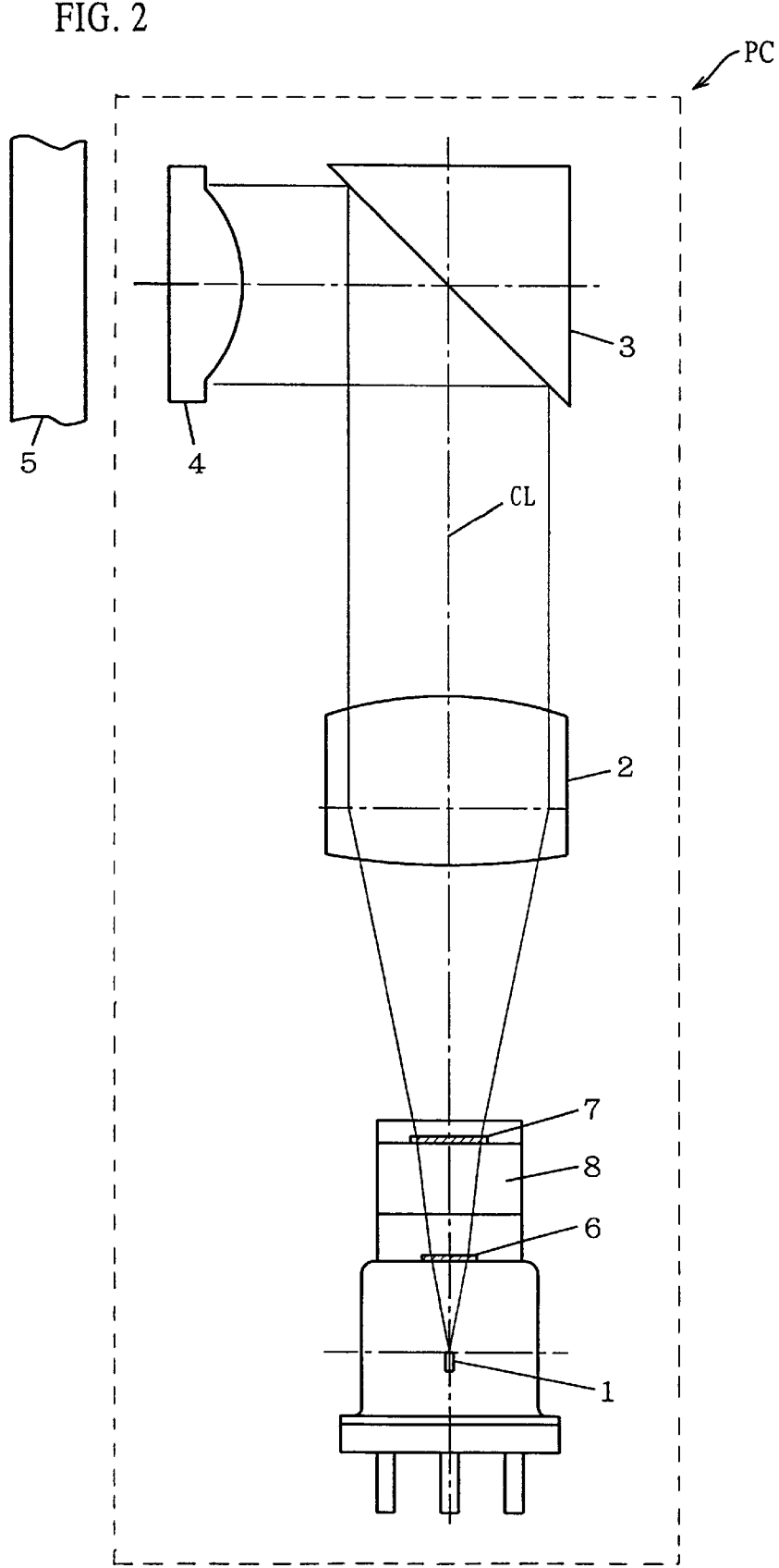
FIG. 2 is a side view of the optical pickup in accordance with one embodiment of the present invention.

FIGS. 1 and 2 are a plan view and a side view, respectively, of an optical pickup in accordance with one embodiment of the present invention. As shown in these figures, an optical pickup PC in accordance with the present embodiment directs a beam to a disk 5 as a magneto-optical recording medium, receives the beam reflected therefrom and detects (reproduces) information signal recorded on disk 5, and the optical pickup includes a package 18, a beam splitter 13, a collimator lens 2, an objective lens 4, and a 45° mirror 3 for reflecting, with the direction converted by 90°, an incident beam between collimator lens 2 and objective lens 4.

A body of package 18 includes a stem 15, a cap 16 mounted on stem 15 and allows passage of a beam through an opening at an upper surface, and a cover glass 17 provided covering the opening at the upper surface of cap 16 for allowing passage of the beam. The body of package 18 includes therein a laser diode 1 as a light source, a photodiode 10 receiving the beam and detecting intensity of the beam, and an optical waveguide device 11 for detecting rotation of the plane of polarization of the light beams divided by beam splitter 13.

Figure 3:
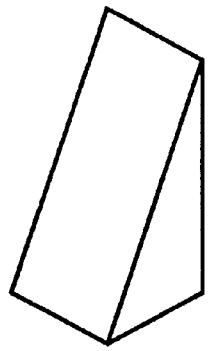
FIG. 3 is a perspective view showing an appearance of a wedge shaped block 12 of FIG. 1.

Laser diode 1 and photodiode 10 are arranged directly on stem 15, while optical waveguide device 11 is arranged on stem 15 with a wedge shaped block 12 interposed. FIG. 3 is a perspective view showing appearance of the wedge shaped block 12 of FIG. 1. Optical waveguide device 11 is fixed in package 18 with its three-dimensional position including height easily adjusted, as wedge shaped block 12 is adhered pressed onto a rear surface of optical waveguide device 11 and an upper surface of stem 15. The shape of wedge-shaped block 12 of FIG. 3 is determined such that the beam reflected from disk 5 is coupled to an optical waveguide layer 24, which will be described later, at a prescribed incident angle. Here, an absorption type analyzer such as a prism or a polaroid film utilizing optical crystal may be utilized as polarization detecting element. However, use of optical waveguide device 11 is preferred as it allows integration of the photodiode, as will be described later.

Beam splitter 13 is mounted on an external upper surface of cap 16 to be opposite to cover glass 17 of package 18, and the beam splitter includes a grating 6, a hologram 7, and first and second reflecting surfaces 8 and 9. Grating 6 includes a diffraction grating, and arranged on an optical path from laser diode 1 to collimator lens 2 for dividing a light beam from laser diode 1 into at least three beams including a main beam and a tracking beam. Hologram 7 is arranged on an optical path from grating 6 to collimator lens 2, and diffracts part of the beam reflected from disk 5. The first reflecting surface 8 is arranged on an optical path from hologram 7 to grating 6, and reflects part of the beam reflected from disk 5 and not diffracted by hologram 7. The second reflecting surface 9 is arranged parallel to the first reflecting surface 8 and reflects beam reflected from the first reflecting surface 8.

Collimator lens 2 and objective lens 4 collect the light beam emitted from laser diode 1 on disk 5. The 45° mirror 3 is arranged such that it changes direction of the beam from collimator lens 2 by 90°.

In an operation, the light beam emitted from laser diode 1 is divided into three light beams by grating 6, and by collimator lens 2 and objective lens 4, two tracking beam spots and one main beam spot are formed on disk 5. The beam reflected from disk 5 passes through objective lens 4 and collimator lens 2, and part of the beam is diffracted by hologram 7. Part of the diffracted beam passes through the first reflecting surface 8, passes by the right side of grating 6, and enters photodiode 10 to be detected as a servo error signal. Hologram 7 and photodiode 10 have conventional shapes, and the servo error signal is detected in accordance with the conventional principle.

Part of the light beam not diffracted by hologram 7 is reflected by the first reflecting surface 8 of beam splitter 13 and thereafter almost entirely reflected by the second reflecting surface 9. The light beam reflected by the second reflecting surface 9 passes through the left side of grating 6 and coupled to optical waveguide device 11.

Figure 4:
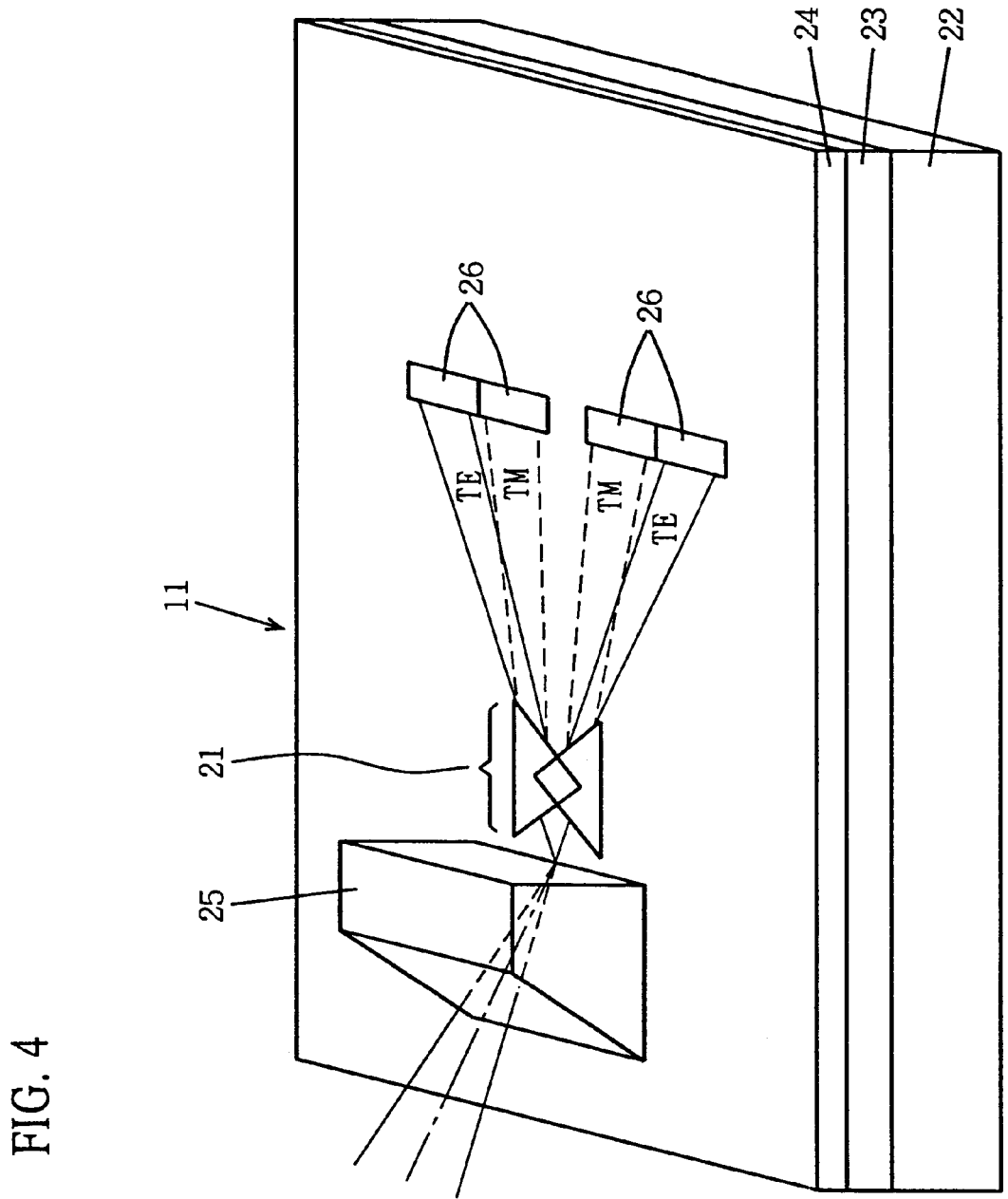
FIG. 4 is a perspective view showing an example of an optical waveguide device 11 of FIG. 1.

FIG. 4 is a perspective view showing an example of optical waveguide device 11 shown in FIG. 1. Optical waveguide device 11 of FIG. 4 has been proposed by the inventors of the present invention. Referring to FIG. 4, optical waveguide device 11 includes an Si substrate 22 having two photodiodes 26 and electronic circuitry, not shown, formed in advance, an optical waveguide layer 24 including a buffer layer 23 and a polarized beam splitter 21 deposited on Si substrate 22, and a coupler prism 25 adhered on optical waveguide layer 24. The beam divided by beam splitter 13 is focused on a corner of coupler prism 25 and coupled to optical waveguide layer 24. The beam entering optical waveguide layer 24 is divided into polarized beams, that is, TE beam and TM beam by polarized beam splitter 21, and enter two photodiodes 26, respectively, so that signals recorded on disk 5 are detected (reproduced).

Referring to FIG. 1, the focal point of the beam reflected from disk 5, which is reflected by the first reflecting surface 8 and thereafter by the second reflecting surface 9 of beam splitter 13 to be coupled to optical waveguide device 11, may preferably be positioned away from cover glass 17, since it increases degree of freedom in arranging optical waveguide device 11. In the optical pickup PC in accordance with the present embodiment, beam splitter 13 including the first reflecting surface 8 is arranged between hologram 7 and laser diode 1. Therefore, the necessary effective aperture of beam splitter 13 can be made smaller, and as a result, it becomes possible to couple the beam reflected from disk 5 to optical waveguide device 11 without interposing any microlens.

When the beam reflected from disk 5 passes through grating 6, the tracking beam and the main beam are overlapped, hindering correct reproduction of the signal on disk 5. In order to avoid this problem, it is necessary that beam splitter 13 is arranged between grating 6 and disk 5. Therefore, beam splitter 13 should desirably be arranged between holograms 7 and grating 6.

Figure 5:
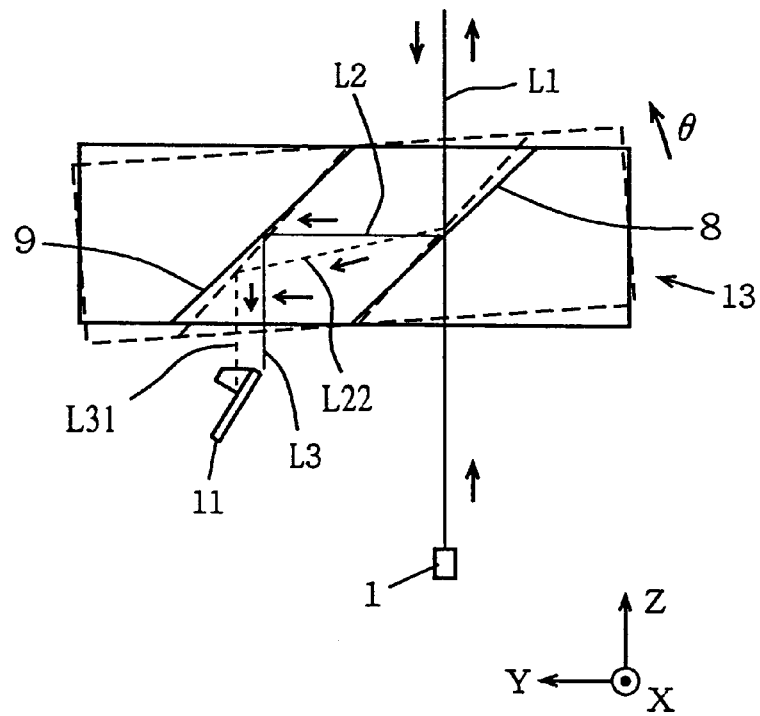
FIG. 5 is an illustration representing a method of compensating relative positional offset between a beam reflected from a disk 5 and optical waveguide device 11 in the optical pickup of FIG. 1.

FIG. 5 is an illustration representing the method of compensation of a relative positional offset between the beam reflected from disk 5 and optical waveguide device 11 in the optical pickup PC shown in FIG. 1. The method of compensation of relative positional offset between the beam reflected from disk 5 and optical waveguide device 11 in the optical pickup PC in accordance with the present embodiment will be described. Referring to FIG. 5, assume that optical waveguide device 11 is arranged offset in the direction of Y, and therefore the beam reflected from disk 5 proceeding along optical paths L1→L2→L3 is offset relatively in position from optical waveguide device 11. Here, when the beam splitter 13 is rotated by θ about the X axis to adjust its attitude, the beam reflected from disk 5 proceeds along optical paths L1→L21→L31, and correctly enter the optical waveguide device 11. At this time, the beam emitted from laser diode 1 is transmitted through the first reflecting surface 8 and enters collimator lens 2 as described above. Therefore, the optical path of the beam emitted from laser diode 1 is not changed by this rotation of beam splitter 13, and the beam passes along optical path L1 and enters collimator lens 2. Therefore, in the optical pickup PC in accordance with the present embodiment, the optical path is not changed by position adjustment of beam splitter 13. Therefore, different from the prior art, adjustment is not made difficult by the change of the optical path. Further in the optical pickup PC shown in FIG. 1, laser diode 1 and collimator lens 2 are arranged on one line (optical axis CL). Therefore, when the outer shape of package 18 is made circular with the optical axis CL being the center and package 18 is rotated about the optical axis CL, orientation of three optical spots can easily be matched on the track of disk 5.

The above described structure prevents the problem that unnecessary reflected beam generated in beam splitter 13 is reflected from disk 5 and detected by photodiode 10, deteriorating quality of the detected (reproduced) signal. Therefore, it is unnecessary to form antireflection film partially on beam splitter 13. This contributes to improve efficiency in mass production of beam splitter 13.

Figure 6:
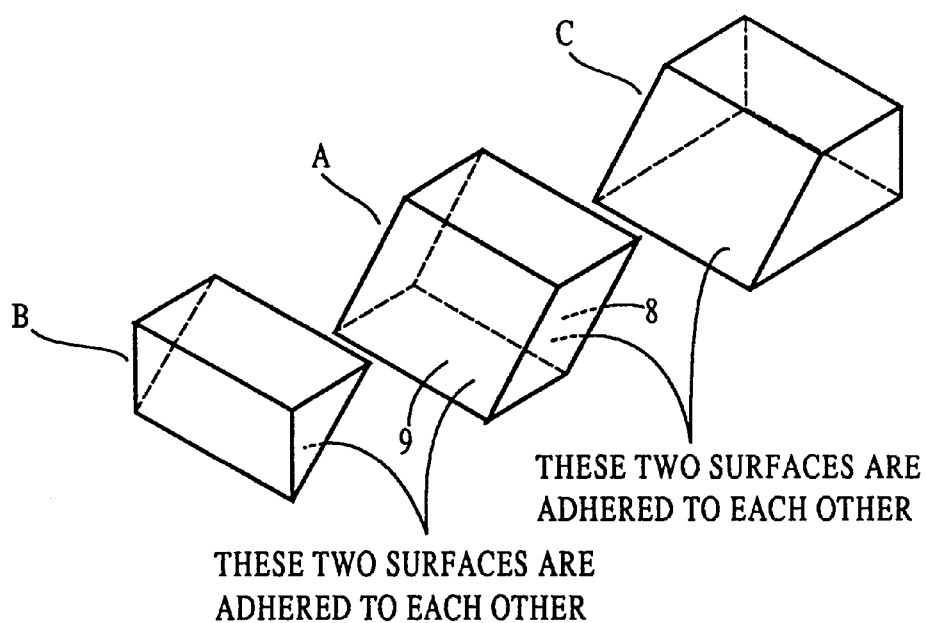
FIG. 6 is an exploded perspective view of a beam splitter 13 of FIG. 1.

FIG. 6 is an exploded perspective view of beam splitter 13 shown in FIG. 1. As shown in FIG. 6, beam splitter 13 is assembled such that first and second reflecting surfaces 8 and 9 opposing to each other of a member A having parallelogram cross section are adhered to corresponding surfaces of two trapezoidal members B and C, respectively, so that the first and second reflecting surfaces 8 and 9 are protected by members B and C. Such a shape of beam splitter 13 suppresses chipping of member A when beam splitter 13 is polished, and therefore production yield in assembling beam splitter 13 can be improved. Further, contamination of the first and second reflecting surfaces 8 and 9 during assembly of the optical system including beam splitter 13 and resulting deterioration of optical characteristics can be avoided.

Figure 8:
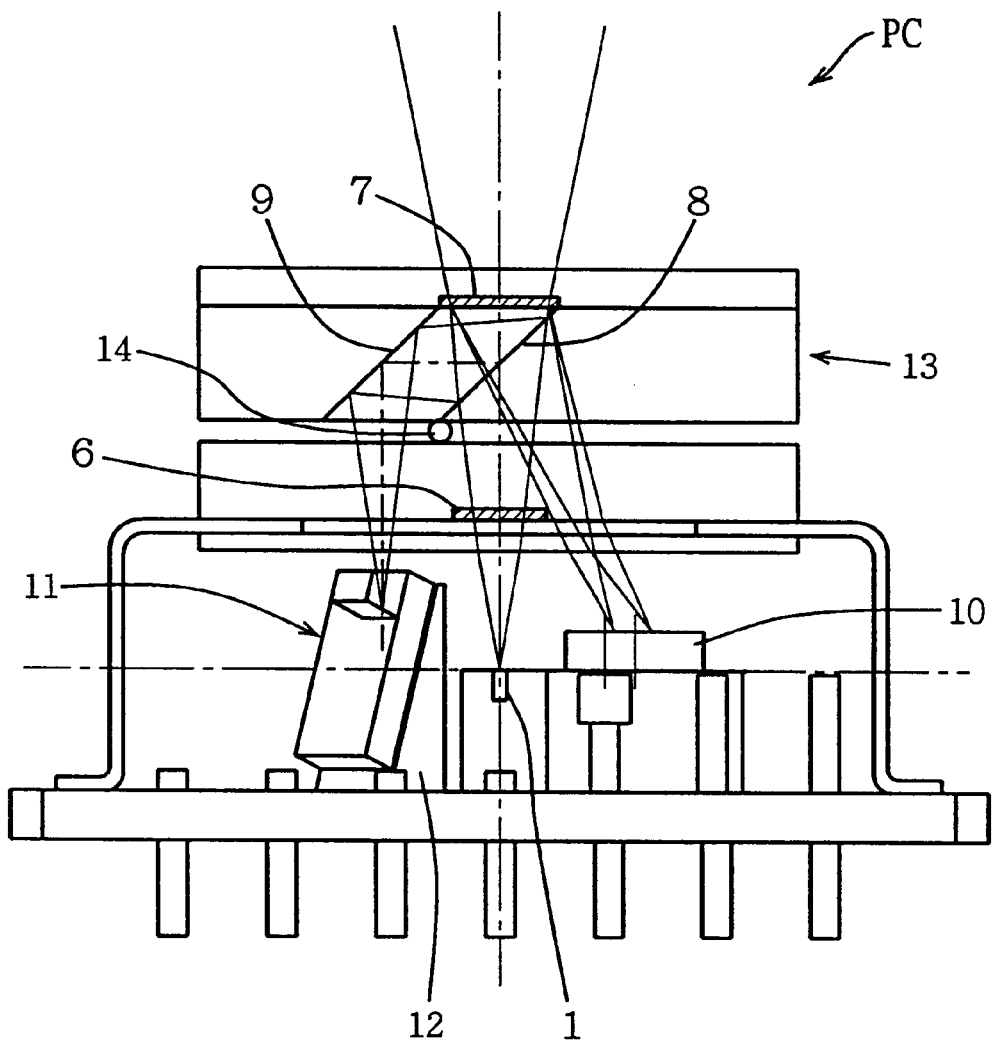
FIG. 8 is a plan view of an optical pickup in accordance with another embodiment of the present invention.
Figure 9:
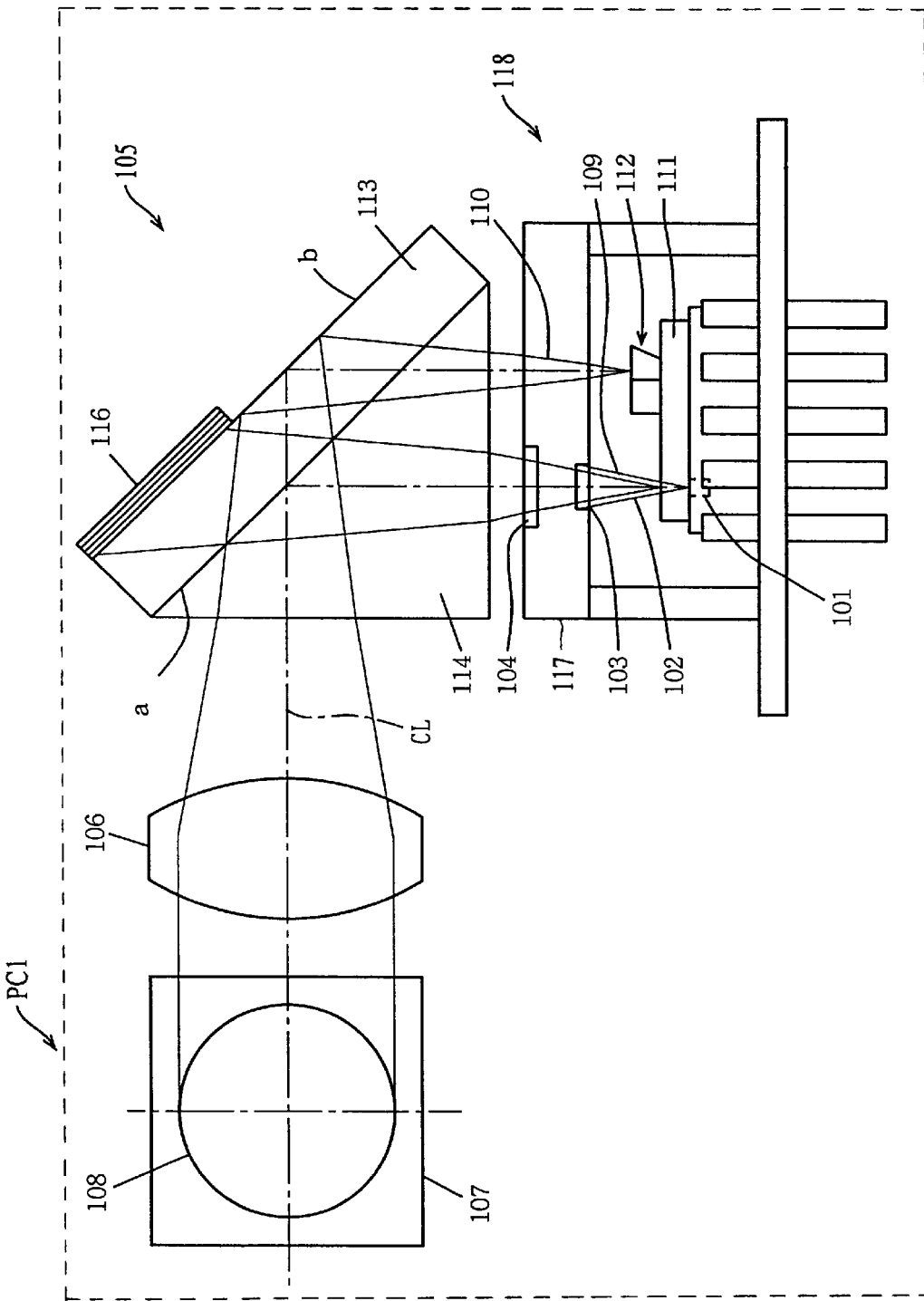
FIG. 9 is a plan view of an optical pickup employing an optical waveguide device for a magneto-optical disk disclosed in Japanese Patent Laying-Open No. 8-171747.
Figure 10:
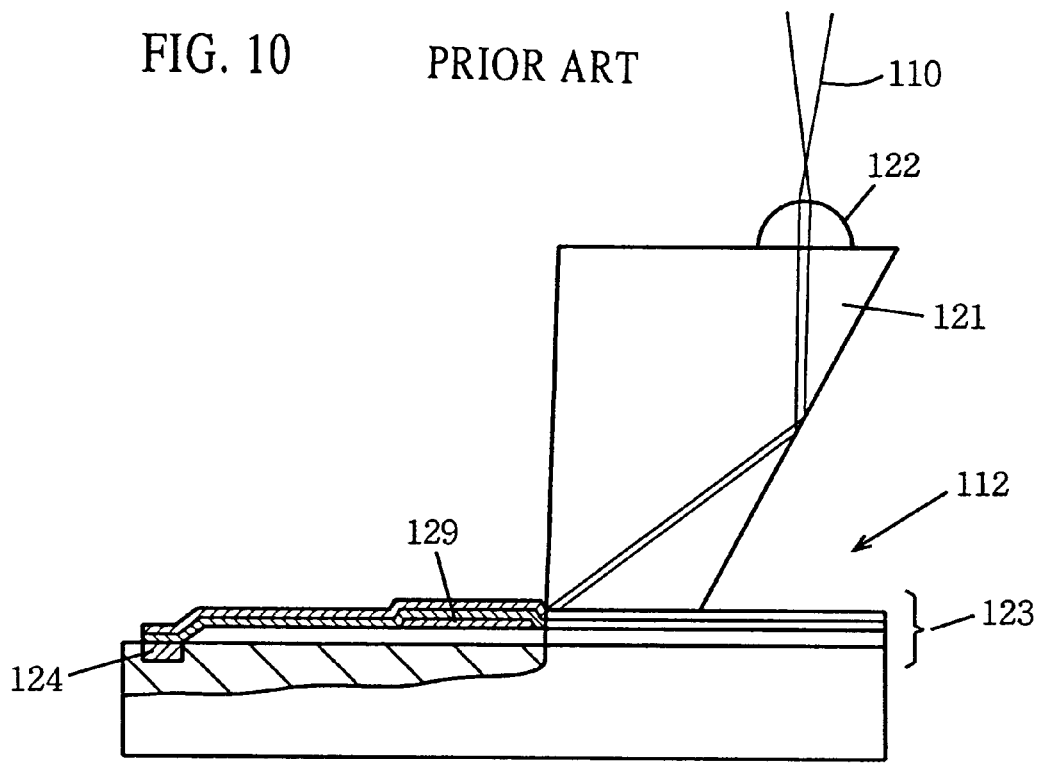
FIG. 10 is a side view of the optical waveguide device shown in FIG. 9.
Figure 11:
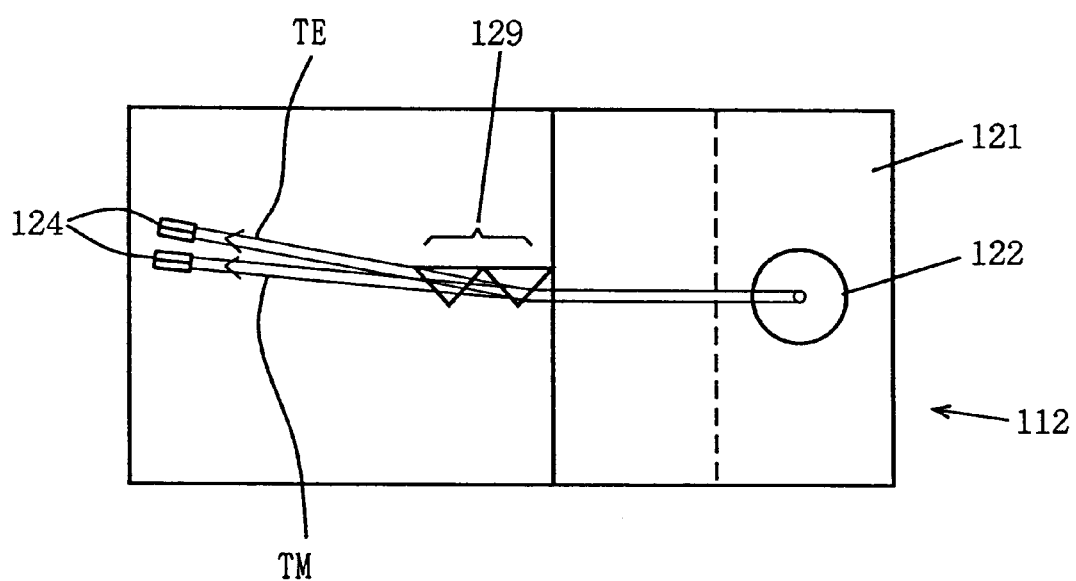
FIG. 11 is a plan view of the optical waveguide device shown in FIG. 9.
Figure 12:
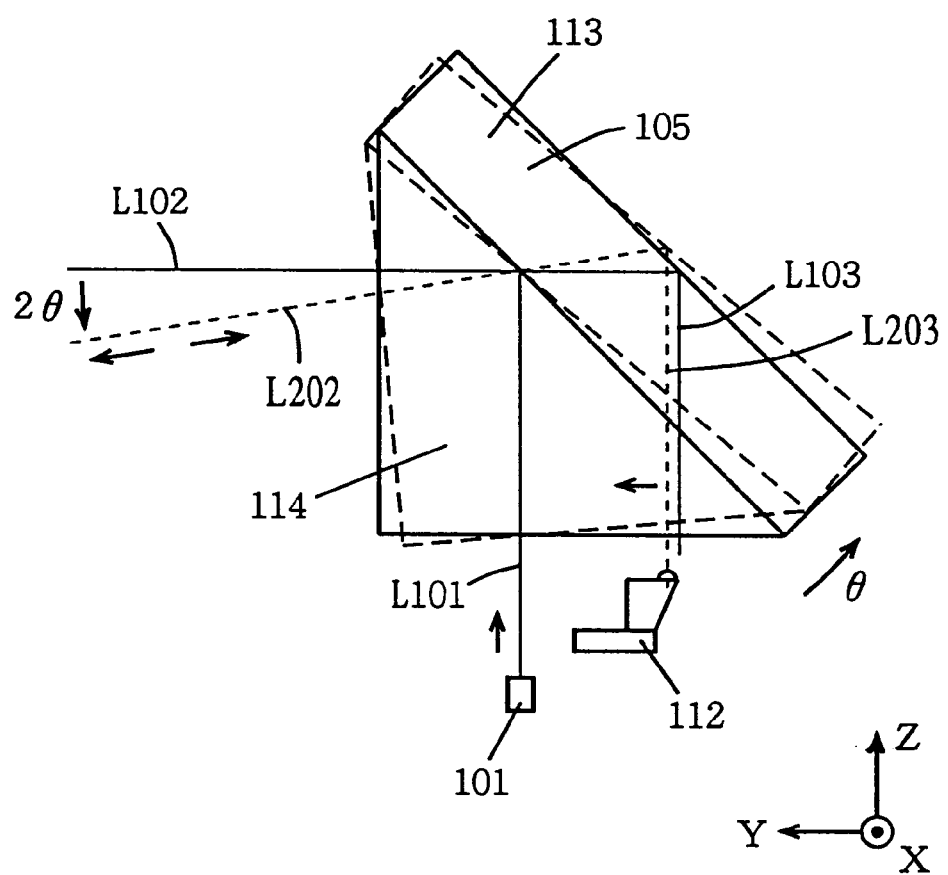
FIG. 12 is an illustration showing a principle of compensation of relative positional offset between a beam reflected from a magneto-optical disk and an optical waveguide device 112 by position adjustment of a beam splitter 105 shown in FIG. 9.

In a common beam splitter, the divided beams are emitted in directions orthogonal to each other, and therefore arrangement of members therearound is limited in that the members must be placed along the two directions orthogonal to each other. However, beam splitter 13 shown in FIG. 1 is free from this limit and grating 6 and hologram 7 may be easily stacked on beam splitter 13. FIG. 8 shows a state in which hologram 7 only is stacked on beam splitter 13.

By adding polarization characteristic to the reflection characteristic of the reflecting surface 8 of beam splitter 13, the angle of rotation of the plane of polarization of the beam, deriving from Kerr effect, can be multiplied. For example, when reflectance of P polarization is 30% and reflectance of S polarization is 100%, the angle of rotation can seemingly be multiplied by 1.8.

Since optical waveguide device 11 is adhered and fixed on stem 15 with wedge shaped block 12 interposed, block 12 should preferably be formed of a light transmitting material such as glass or transparent resin. When block 12 is formed of a light transmitting material, a photo-curing adhesive may be used for adhering block 12 with optical waveguide device 11. Therefore, thermo stress causing deterioration of electrical characteristic experienced by optical waveguide device 11 when a thermosetting adhesive is used, can be avoided. Further, there is not any time limit for positional adjustment of block 12 on optical waveguide device 11, which is imposed when an anaerobic adhesive is used. When glass is used as the material of block 12, optical waveguide device 11 is electrically insulated from laser diode 1 or photodiode 10. This improves degree of freedom in designing electric circuitry used for the optical pickup PC. At the same time, influence of other circuitry can be reduced. Therefore, signals with superior SN ratio can be detected. Since the photo-curing adhesive mentioned above absorbs moisture and swells, package 18 should preferably be airtightly sealed. The air-tight sealing is attained by welding cap 16 and stem 15 in a container filled with nitrogen gas, which is an inert gas. By the air-tight sealing, inside of package 18 is kept dry. Therefore, the photo-curing adhesive does not swell and relative position between optical waveguide device 11 and laser diode 1 can be kept stable.

Figure 7:
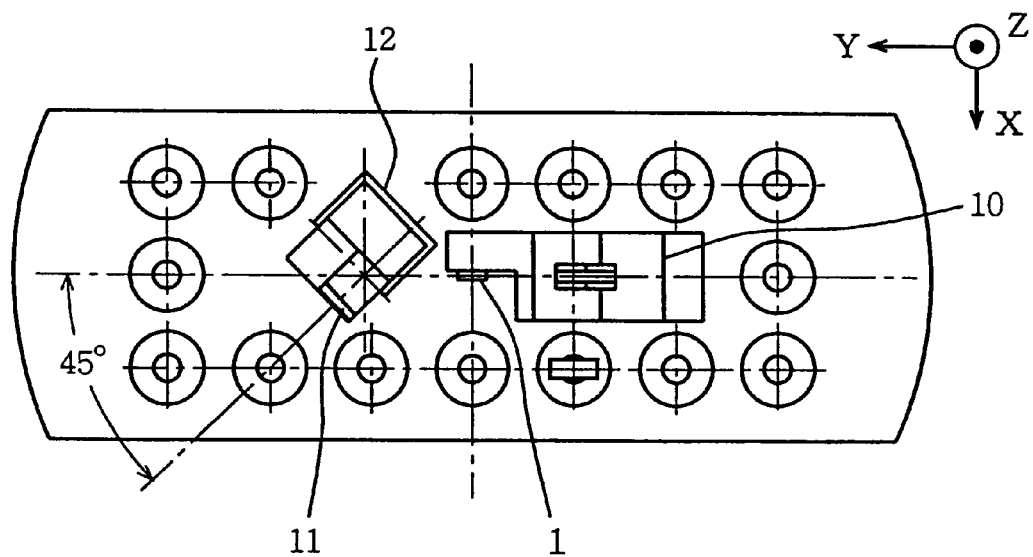
FIG. 7 is a plan view showing an example of arrangement of optical waveguide device 11, laser diode 1 and photodiode 10 of FIG. 1.

FIG. 7 is a plan view showing an example of arrangement of optical waveguide device 11, laser diode 1 and photodiode 10 shown in FIG. 1. The direction of polarization of the beam emitted from laser diode 1 is parallel to the Y axis. Meanwhile, the beam reflected from disk 5 has its plane of polarization rotated by 1 to 2° by the Kerr effect. The amount of rotation is small, and therefore it is preferable to detect polarized beam of which orientation of polarization is ±45° with respect to polarization of the beam collected onto disk 5, and to detect a differential signal.

Therefore, as shown in FIG. 7, when optical waveguide device 11 is arranged inclined by 45° with respect to the Y axis, the TE beam and TM beam in optical waveguide device 11 correspond to the polarized beam at the orientation of ±45° with respect to the beam emitted from laser diode 1, and hence a detection (reproduction) signal with high SN ratio can be obtained.

FIG. 8 is a plan view of an optical pickup in accordance with another embodiment of the present invention. In the optical pickup PC shown in FIG. 8, laser diode 1, photodiode 10 and optical waveguide device 11 are fixed at prescribed positions on stem 15, respectively, cap 16 is attached to stem 15 to cover these components, and thereafter grating 6, beam splitter 13 and hologram 7 are successively fixed with positions adjusted, on cap 16. At this time, beam splitter 13 is rotated about the X and Z axes as shown in FIG. 5, so as to adjust the position of optical waveguide device 11 with respect to the beam reflected from disk 5. At this time, there is not a fulcrum about the X axis. Therefore, it is necessary that beam splitter 13 is rotated and adjusted in position while it is held in air, the beam splitter 13 is moved parallel while keeping the adjusted attitude to be in contact with grating 6, and that the beam splitter 13 is adhered and fixed. This procedure of position adjustment is complicated and troublesome. When beam splitter 13 is brought into contact with a wall surface of a member, where grating 6 is formed, by means of a columner member 14 as shown in FIG. 8, it is possible to easily rotate beam splitter 13 about the X axis utilizing rolling of columner member 14 to adjust positions of the optical waveguide device 11 and the beam reflected from disk 5. Columner member 14 may, for example, be an optical fiber which has high out of roundness and is inexpensive.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup, comprising:

a light source;

light converging means for collecting a light beam emitted from said light source to an optical recording medium;

beam dividing means arranged on an optical path from said light source to said light converging means for dividing the light beam from said light source;

diffracting means arranged on said optical path between said beam dividing means and said light converging means, for diffracting a part of a beam reflected from said optical recording medium;

a beam splitter arranged between said beam dividing means and said diffracting means;

photodetector means for electrically detecting the reflected beam which is diffracted by said diffracting means; and polarization detecting means for detecting rotation of a plane of polarization of the beam reflected from said optical recording medium and passed through said beam splitter; wherein said beam splitter has a first reflecting surface transmitting the light beam from said light source, transmitting a part of the beam reflected from said optical recording medium and passed through said diffracting means in a direction not interfering with said beam dividing means, and reflecting the remaining part of the reflected beam passed through said diffracting means, and a second reflecting surface for reflecting the beam reflected by said first reflecting surface to a direction of said polarization detecting means.

2. The optical pickup according to claim 1, wherein said beam splitter includes a member having a parallelogram cross section of which two opposing surfaces are said first and second reflecting surfaces, and trapezoidal members on both sides of the member.

3. The optical pickup according to claim 2, wherein said beam dividing means or said diffracting means and said beam splitter are stacked.

4. The optical pickup according to claim 1, wherein said polarization detecting means is an optical waveguide device.

5. The optical pickup according to claim 4, wherein said photodetector means is a photodiode, and said photodiode and said optical waveguide device are integrated.

6. The optical pickup according to claim 4, wherein said optical waveguide device is adhered and fixed in a package with a wedge shaped block made of a light transmitting material interposed.

7. The optical pickup according to claim 6, wherein said light source, said photodetector means and said optical waveguide device are arranged in one said package and air-tightly sealed.

8. The optical pickup according to claim 1, wherein said light source, said photodetector means and said polarization detecting means are arranged in one package and air-tightly sealed.

9. The optical pickup according to claim 1, wherein said beam splitter is stacked on said beam dividing means with a columner member interposed.

* * * * *